Oct. 13, 1936.  F. H. RICHTERKESSING  2,057,448
TROLLEY CONTACTOR
Filed Jan. 25, 1932

Inventor
FRANK H. RICHTERKESSING
By John L. Milton
Attorney

Patented Oct. 13, 1936

2,057,448

UNITED STATES PATENT OFFICE 2,057,448

TROLLEY CONTACTOR

Frank H. Richterkessing, Louisville, Ky., assignor to Cheatham Electric Switching Device Company, Louisville, Ky., a corporation of Kentucky Application January 25, 1932, Serial No. 588,547

17 Claims. (Cl. 246—254)

The object of my invention is to improve the construction of trolley contactors frequently designated as trolley pans of the class and character mounted on or adjacent electric railway trolley wires. These trolley pans are so arranged and disposed that a trolley wheel in its course of travel will make contact with same and will not be subjected to shock which occurs when it shifts contact from its groove to its flange in the path of which are provided sections or contacts of the trolley pan. These contacts are provided to transmit current from the trolley wire to circuits connected to electrical devices employed in combination with the operation of a passing trolley car.

An object of this invention is not only to cause the trolley wheel to pass on and off of the trolley pan without shock but to so arrange the parts that the trolley wire will be subjected to the minimum of distortion which in itself makes for ease of installation. A further object is to so dispose and protect the trolley wire in terms of the contacting members where flashes resulting from the disruption of arcs of heavy current take place, that said wire will not be involved, even if the arcs continue until parts of the contactor are destroyed.

Figure 1:
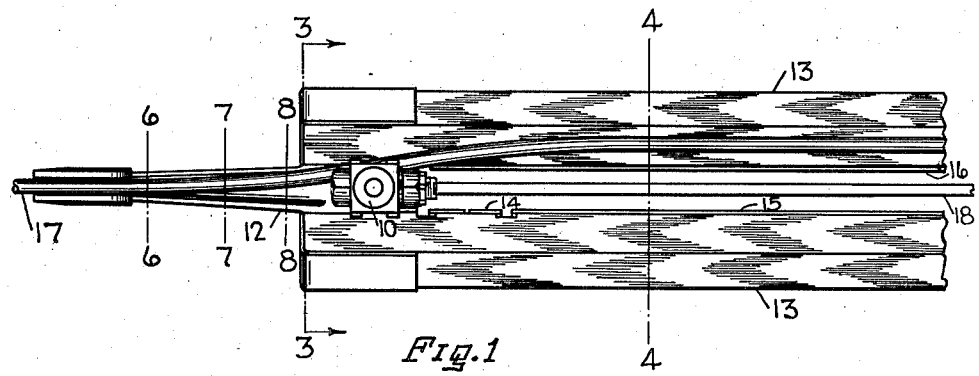
Figure 2:
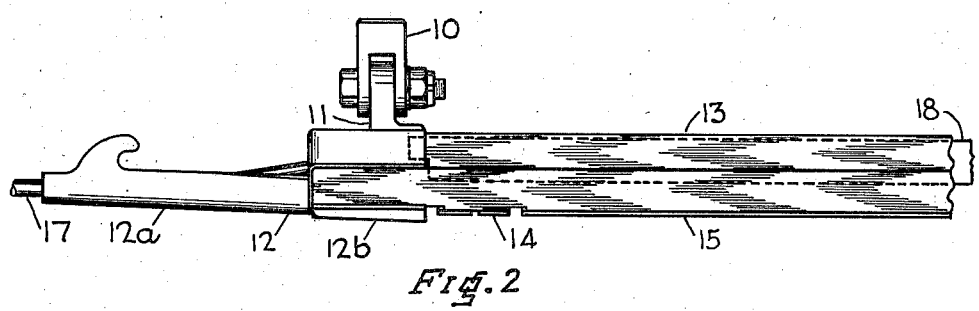
Figure 9:
Figure 3:
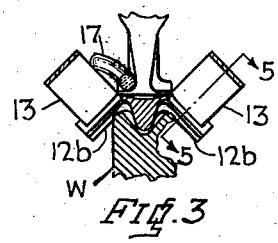
Figure 4:
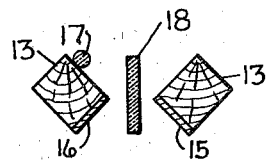
Figure 5:
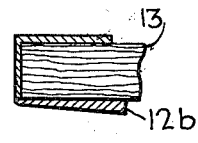

In the accompanying drawing forming a part hereof, Figure 1 is a plan view of an end section of the trolley pan which is substantially the same as the omitted end. Fig. 2 is a side elevation of Fig. 1. Figs. 3, 4, 6, 7, and 8 are cross sections of Fig. 1 along the lines carrying corresponding numerals on Fig. 1, it being understood that these are given as true cross sections of the parts. For the purpose of clearness the members falling in the background from such cross sections are omitted. Fig. 5 is a cross-section of Fig. 3 along the line 5, 5. Fig. 9 is a perspective of a modified form of arc barrier.

The trolley pan illustrated herewith belongs to that class of trolley wire contactors arranged to coordinate with a trolley wheel or shoe and it is arranged to be attached to the trolley wire as taught in U. S. patent to Kempton, 1,166,912, and is further supported by suitable span wire suspension from the adjustable clevis 10 which is attached to vertical post 11, forming part of metallic bracket 12 which is attached by bolts or screws, not shown in the drawing, to beams 13, 13, usually composed of wood. These beams in turn carry facing plates 14, 15, 16, to form contact members for suitable connections to circuits leading therefrom which will be energized as the grooved transient contact member leaves trolley wire 17 and engages the tapering approach 12a, which guides the wheel so that its flanges will engage with the underneath surfaces 12b, 12b of the bracket, and effect the indicated contacts, as the car proceeds.

Trolley wire 17 is shown lodged in the tapering channel of bracket 12 where it is vertically and horizontally displaced from a straight line to a gradually curving one so as not to produce any kinks or permanent bends. This displacement continues to increase so that it will pass post 11 and find its own location well removed from a straight central line to one side and out of the path of destructive arcs which are incident to the trolley wheel engaging and leaving contact members as at 14, assuming that the path of the wheel is from left to right. The arc is the result in some cases of disrupting a current of 600 volts and 10 amperes which has been in circuit with a heavy ground solenoid for throwing a track switch. To facilitate controlling this arc an arc barrier 18 of the structure taught in United States patent to Stolp No. 1,824,844 is provided. Special attention is directed to the fact that the trolley wire is well removed from this scene of action and therefore not only protects the trolley wire but the wood members 13, 13.

Considering a trolley wheel as moving from left to right as it passes from wire 17 on to approach 12a, the contact is with the bottom of the groove. Approach member 12a tapers downward from a theoretically central line, so that the engagement between the wheel and the approach member 12a continues to be effected by way of the bottom of the groove so that the wheel is somewhat depressed. The wheel flanges engage the tapering surfaces 12b, 12b, see Fig. 5, the incident point of contact varying according to the diameter of the wheel and its relation to the groove, the nature of which is also a factor in determining just where the contact is effected.

Figure 6:
Figure 7:
Figure 8:

The general contour of the approach 12a can be considered from any given point of the inverted arc of same as shown in Figs. 6, 7, and 8. Any straight lines extended linearly across the surface of 12a will intersect an extended plane extended from surfaces 12b, 12b. In other words, the contours of 12a and surfaces 12b, 12b are convergingly disposed so that at one point regardless of the diameter of the trolley wheel or the relation of the flanges to the groove there will be an instantaneous simultaneous engagement of the groove with 12a and the flanges with 12b thereby effecting a shifting of contact from the groove to the flanges in a smooth undisturbed operation, one that is entirely free from shock or jump. It is to be understood that there are two brackets 12, one of each being disposed at each end of the contactor. It will thus be apparent that as the trolley wheel leaves the contactor the reverse order of operation will take place, i. e., the contact of the wheel will be transferred gradually from the flanges to the groove without shock.

The arc barrier 18 which is of arc resisting material, such as asbestos base compound is loosely supported at each end by the corresponding bracket. The loose feature is provided so that the wheel can actually engage the barrier which will move upward just enough to prevent it from sustaining the pressure of the wheel as it passes through. It will be perceived that the barrier immediately falls which condition improves its capacity to disrupt the arc more than if it were sustained at a given height which would necessarily be above the groove of the wheel to effect a clearance, especially as the desirable arc resisting insulating material of the barrier is not suitable to withstand the incident mechanical forces.

It will be noted that with this arrangement the arc barrier can be reversed from end to end to present a new surface adjacent the arcing area and thereby enable the user to derive a prolonged service on the materials provided. Fig. 9 shows a complete arc barrier on a reduced scale in a modified form wherein it can not only be reversed to present a fresh surface to the arc but can be turned over so as to use both end areas, thereby providing four changes.

Many changes in form, contour and general relations can be indulged without departing from the spirit of the invention. Therefore, I wish to be limited only by the appended claims.

I claim:

1. A trolley wire in combination with a trolley pan carried by a pair of metallic brackets, said wire being disposed adjacent each bracket and traversing the full length of said pan and being vertically and horizontally offset from a central line passing through said brackets and an arc barrier supported by said brackets.

2. A trolley wire in combination with a trolley pan carried by a pair of metallic brackets, said wire being offset in each bracket and traversing the full length of said pan and being vertically and horizontally offset from a central line passing through said brackets and an arc barrier loosely supported by said brackets.

3. The combination of a trolley wheel and a trolley pan constructed with segmental electrical contacting bars carried on insulated material supported by brackets constructed with a tapering depending contour, each of said brackets also being provided with tapering depending surfaces, angularly disposed to horizontal and vertical planes, said contour and said surfaces being convergingly disposed so that there will be a simultaneous engagement of the groove and flanges of said wheel with said contour and said surfaces as said wheel traverses one of said brackets.

4. A trolley wheel in combination with a trolley pan comprising a plurality of contact surfaces carried on a pair of non-conductor beams terminating in metallic brackets constructed with a tapering depending contour, each of said brackets also being provided with tapering depending flat surfaces, angularly disposed to horizontal and vertical planes, said contour and said surfaces being convergingly disposed for simultaneous engagement with the groove and flanges of said wheel as it traverses one of said brackets.

5. The combination of a trolley wire, a trolley wheel and a trolley pan constructed with insulated material suported by brackets which are constructed with a tapering depending contour, each of said brackets also being provided with tapering depending angularly disposed surfaces, said contour and said surfaces being convergingly disposed for simultaneous engagement with the groove and flanges of said wheel, said wire being disposed adjacent each bracket and traversing the full length of said pan and being vertically and horizontally offset from a central line passing through said brackets.

6. A trolley pan constructed with segmental electrical contacting bars carried on insulated material supported by brackets constructed with approach contacting surfaces and disposed at each end of said pan, in combination with a trolley wheel and a trolley wire connected to a current source and being diagonally disposed in each bracket and traversing the full length of said pan, said wire being vertically and horizontally offset away from an electric arc resulting from said wheel interrupting an electrical circuit while traversing said bars.

7. A trolley wheel and a trolley wire in combination with a trolley pan comprising a plurality of contact surfaces carried on a pair of non-conductor beams terminating in metallic brackets constructed with tapering depending contour, each of said brackets also being provided with tapering depending surfaces, angularly disposed to vertical and horizontal planes, said contour and said surfaces being convergingly disposed for simultaneous engagement with the groove and flanges of said wheel as it traverses one of said brackets.

8. The combination of a trolley wire, a trolley wheel and a trolley pan constructed with insulated material supported by brackets which are constructed with a tapering depending contour, each of said brackets also being provided with tapering depending angularly disposed surfaces, said contour and said surfaces being convergingly disposed for simultaneous engagement with the groove and flanges of said wheel, said wire being disposed adjacent each bracket and traversing the full length of said pan and being vertically and horizontally offset from a central line passing through said brackets which also support an arc barrier.

9. The combination of a trolley wire, a trolley wheel and a trolley pan constructed with insulated material supported by brackets which are constructed with a tapering depending contour, each of said brackets also being provided with tapering depending angularly disposed surfaces, said contour and said surfaces being convergingly disposed for simultaneous engagement with the groove and flanges of said wheel, said wire being disposed adjacent each bracket and traversing the full length of said pan and being vertically and horizontally offset from a central line passing through said brackets which also support an integral arc barrier.

10. A trolley wire in combination with a trolley pan clamped on said wire in a pair of metallic brackets, said wire being diagonally and horizontally upwardly offset in each bracket in terms of a central line passing through said brackets, to a location substantially parallel to a vertical plane passing through said brackets.

11. A trolley pan constructed with sections of electrical contacting bars longitudinally carried on parallel beams of insulated material united at their ends and supported by hollow metallic brackets in combination with a trolley wheel and a trolley wire connected to a source of current, said wire being diagonally and horizontally upwardly offset in terms of a central line passing through said brackets and to a position in substantial parallelism to a vertical plane also passing through said brackets.

12. A trolley pan constructed with sections of electrical contacting bars longitudinally carried on parallel beams of insulated material united at their ends and supported by hollow metallic brackets in combination with a trolley wheel and a trolley wire connected to a source of current, said wire being diagonally and horizontally upwardly offset in terms of a central line passing through said brackets and to a position in substantial parallelism to a vertical plane also passing through said brackets and out of the path of an electrical arc resulting from said wheel interrupting an electric current while traversing said bars.

13. In combination a grooved traveling contactor and a trolley pan, comprising a pair of longitudinally extending spaced beams of insulating material connected together at each end by an integral bracket fashioned with a tapering depending contour proportioned for engagement with a groove of said contactor, said bracket also being provided with a pair of tapering depending surfaces, each angularly disposed to the other and located for engagement with the flanges of said wheel as it traverses one of said brackets.

14. In combination, a trolley wheel and a trolley pan having integral metallic brackets attached to a trolley wire whereby said pan is carried on said wire, said brackets being constructed with a plurality of electrical approach contacting surfaces, one of said contacting surfaces being fashioned with a tapering depending contour disposed for engagement with the groove of said wheel as it traverses said bracket, another portion of said bracket being provided with a pair of tapering depending planar surfaces angularly disposed to horizontal and vertical planes and located for engagement with the flanges of said wheel, said contour and said surfaces being convergingly disposed for simultaneous engagement with the groove and flanges of said wheel.

15. In combination, a trolley wheel and a trolley pan having integral metallic brackets attached to a trolley wire whereby said pan is carried on said wire, said brackets being constructed with a plurality of electrical approach contacting surfaces, one of said contacting surfaces being fashioned with a tapering depending contour disposed for engagement with the groove of said wheel as it traverses said bracket, other portions of said bracket being provided with a pair of tapering planar surfaces angularly disposed to vertical and horizontal planes and located for engagement with the flanges of said wheel, said contour and said surfaces being convergingly disposed for instant simultaneous engagement with the groove and flanges of said wheel as it traverses one of said brackets.

16. A bracket for clamping a trolley wire to a trolley pan, said bracket comprising means for directing said wire diagonally and horizontally upwardly offset in said bracket.

17. A bracket for clamping a trolley wire to a trolley pan, said bracket comprising means for directing said wire diagonally and horizontally upwardly offset in said bracket and in a plane substantially 45 degrees to a vertical plane passing through said pan.

FRANK H. RICHTERKESSING.